May 23, 1939.　　　O. F. NEITZKE　　　2,159,670
MACHINE FOR MIXING HOMOGENIZING, AND DISPERSING PURPOSES
Filed April 29, 1937
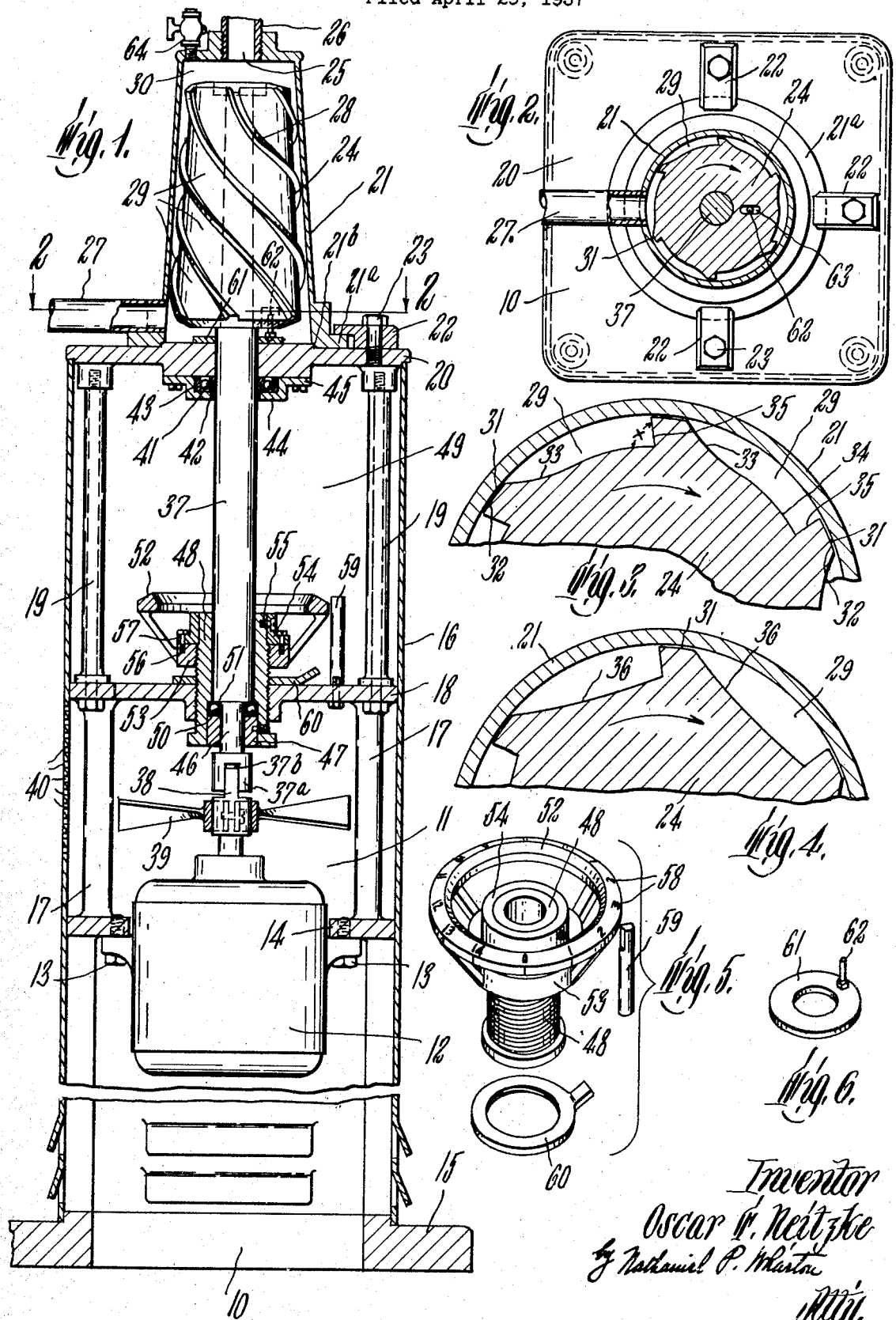
Inventor
Oscar F. Neitzke
by Nathaniel P. Wharton
Atty.

Patented May 23, 1939

2,159,670

UNITED STATES PATENT OFFICE 2,159,670

MACHINE FOR MIXING, HOMOGENIZING AND DISPERSING PURPOSES

Oscar F. Neitzke, Belmont, Mass., assignor to Bennett Incorporated, Cambridge, Mass., a corporation of Massachusetts Application April 29, 1937, Serial No. 139,740

6 Claims. (Cl. 99—266)

This invention relates to a machine for mixing, homogenizing, and dispersing purposes, for instance, for emulsifying or dispersing liquid, semi-solid, or solid materials in water and other liquid media, and for treating ice-cream, mayonnaise, cheese, or other food mixtures to produce smooth, intimately mixed or homogenized compositions of liquid, semi-liquid, or pasty consistency.

The machine of the instant invention is designed for the foregoing purposes and affords such advantages as simplicity, compact structure, ease of cleaning the surfaces contacting with the material being treated, ready adjustability of the active or mixing surfaces so as to enable control of the intimacy of mixing or the fineness of homogenization or dispersion of the material being treated. Broadly stated, the machine hereof comprises a dispersing, homogenizing, or mixing chamber defined by a frusto-conically shaped casing or shell wherein there is provided substantially axially a rotor on whose periphery there are spaced ribs preferably extending helically from one end of the rotor to the other, which ribs, together with the internal wall of the casing, define very narrow clearances through which the material being treated is caused to flow under the feeding or propulsive influence of the ribs and is thus subjected to the shearing, grinding, and abrasive actions of the ribs conducive to the desired mixture, homogenization, or dispersion of such material. The ribs or active elements of the rotor hereof are preferably of a particular cross-sectional configuration, namely, a configuration such that their leading faces or flanks continue or merge smoothly with the rotor periphery, wherefore, the material being treated is fed smoothly or uninterruptedly into the clearances or nips between the outer rib edges and the internal casing wall and there is no tendency for material to become entrapped or pocketed in the compartments or spaces between the ribs and, accordingly, no tendency for imperfectly treated material to work its way down through such compartments or spaces into the finished material being discharged by the machine. In this latter connection, it might be noted that the casing and rotor of the machine hereof are preferably substantially vertically stationed, in consequence of which, besides the feeding or propulsive movement of the material into the clearances between the ribs and internal casing wall, there is tendency for the material to gravitate to the lower end of the casing, whereat the finished material is being discharged.

With the foregoing and other features and objects in view, the invention hereof will now be described in further detail with particular reference to the accompanying drawing, wherein, Figure 1 is a largely vertical sectional view through a machine embodying the invention hereof.

Figure 2 represents a section on the line 2—2 of Figure 1.

Figure 3 is an enlarged fragmentary section through the rotor and casing elements.

Figure 4 is a view similar to Figure 3 but showing a modified form of rotor.

Figure 5 depicts in perspective certain parts for adjusting the rotor relative to the casing disassembled from the machine.

Figure 6 shows in perspective an element used for sealing the base of the casing against leakage.

As appears in Figures 1 and 2, the frame for the machine hereof may be of generally box-like form and comprise a lower compartment 11 wherein is housed an electric motor 12 affixed, as by bolts 13, to cross-bars 14. The cross-bars 14 may form part of a skeleton frame resting at its base 15 on the floor and enclosed by metal plate 16 presenting an attractive external appearance. Upstanding from the cross-bars 14 are shown posts 17 carrying fixed thereto well above the motor 12 a transverse partition 18 from which rise posts 19 to whose upper extremities is suitably secured a top plate or table 20 serving as the lower end of the treating chamber of the machine hereof.

The treating chamber of the machine hereof is defined by a frusto-conical casing or shell 21 whose lower end portion is outwardly flanged as at 21a so that it may be tightly held against the nicely finished upper table surface by readily releasable lugs 22 affixed to the table, as by bolts 23. Substantially leakproof engagement between the flange portions 21a and the upper table surface may be ensured by forming an annular recess 21b at the inner corner of such portion into which recess is nicely fitted a complementary annular shoulder provided on the upper table surface. This annular shoulder additionally and importantly enables the casing 21 to be readily assembled substantially coaxially with the rotor 24. The casing 21 has a top opening 25 in which may be threaded a feed pipe 26 removably secured to a pipe (not shown) leading to a source of supply of the material to be treated; and, the treated material may be emitted from the casing by way of a discharge pipe 27 communicating with the lower end of the casing and leading to a receiver (not shown).

The rotor 24 is shown provided with a plurality of helical ribs 28 projecting outwardly in spaced relationship from its periphery and extending from one end of the rotor to its other end so as to define therebetween a plurality of helical compartments 29 into which material may flow from the receiving space 30 above the rotor top. By reason of the helical form of the ribs 28 and the high speed at which the rotor 24 is caused to rotate, material entering into the compartments 29 is kept under centrifugal force against the substantially smooth internal casing wall and is impelled or caused to flow into and through narrow clearance spaces 31 defined between the outer rib edges 32 and the internal casing wall, in consequence of which the material undergoes the intensive shearing, grinding, abrasive, and other disruptive influences incident to its passage through such narrow clearances and the material emerging at the lower ends of the compartments 29 and passing out through the discharge pipe 27 is intimately mixed, homogenized, or dispersed, as the case may be. In order to avoid entrapment or pocketing of material in the compartments 29 and gravitational downward feed through such compartments of untreated or imperfectly treated material, it is highly desirable that the leading flanks or faces 33 of the ribs merge or continue smoothly with the rotor periphery 34, as appears best in Figure 3. Material entering into the compartments 29 hence pursues uninterrupted or streamline flow from such compartments into and through the clearance spaces 32. While the following or back face 35 of the rotor ribs may extend radially or otherwise from the rotor periphery, there is some advantage in having such face extend at an obtuse angle indicated as $x$, from the rotor periphery so as to provide compartments 29 of maximum capacity for receiving material. It might be noted that the smooth line merger between the leading flank of the ribs 28 and the rotor periphery may assume various contours besides that shown in Figure 3, wherein the leading flank face 33 is slightly upwardly convex. For instance, the smooth line merger between the leading flank face of the ribs 28 and the rotor periphery shown in Figure 4 is one wherein the leading flank face of the ribs 28 is slightly concave. Again, as previously indicated, the contour of the ribs on the rotary periphery need not necessarily be helical. Thus, it is possible to provide spaced ribs on the rotor periphery extending in substantially straight lines from the top of the rotor to its bottom so that the outer faces of such ribs constitute in effect straight line elements of the frusto-conical surface generated by such faces during the rotation of the rotor; and, while such latter ribs perform satisfactorily, one does not realize thereby for a given speed of rotor rotation the same output of material as when the ribs are helical and lie at an angle of, say, about 45° from the elements of the frusto-conical surface generated by the outer rib faces.

The rotor shaft 37 is shown as extending downwardly from the lower end of the rotor through the table 20 and the transverse partition 18 and as terminating within the lower compartment 11 as an enlarged coupling element 37a containing an elongated vertical slot 37b for receiving therein a mating tongue 38 forming the upper end portion of the electric motor shaft. If desired, the electric motor shaft may carry affixed thereto fan blades 39 for exhausting through ventilating apertures 40 in the metal plate 16 such hot air as may be developed in the compartment 11.

The upper end portion of the shaft 37 may rotate in ball bearings 41 confined between an inner race 42 fixed to the shaft 37 and an outer race 43 fixed to an annular flange 44 afforded by a bracket 45 fastened to the under face of the table 20. The portion of the shaft 37 immediately above the member 37a, indicated at 46, is shown as being of reduced diameter and as being surrounded by a collar 47 suitably fixed to a sleeve 48 which extends from the compartment 11 through the partition 18 into an upper compartment 49 between such partition and the table 20 and which is in threaded engagement with the partition wall immediately surrounding the opening in such partition for the shaft 37. The shaft 37 is journaled for rotation within such sleeve 48 and its end thrust and that of the rotor 24 carried thereby is taken on a ball bearing 50 placed between an annular shoulder 51 formed in such shaft and the upper end of the collar 47. To the end of enabling vertical movement of the shaft 37 and the rotor 24 carried thereby, a hand wheel 52 is provided, which hand wheel includes a hub 53 threaded onto the upper end portion of the sleeve 48 and fixed to such sleeve, as by an annular angular piece 54. As shown, the piece 54 surrounds an unthreaded upper end portion of the sleeve 48, to which it is fixed by screws 55, and comprises an outwardly turned lower flange 56 fixed by screws 57 to the hand wheel hub 53, thereby enabling adjustment of the hand wheel relative to the sleeve 48 for calibration purpose. In this latter connection, it might be remarked that the hand wheel 52 preferably carries thereon graduations 58, as appears in Figure 5, which graduations may be read with relation to a pointer 59 upstanding from the partition 18 immediately next to the hand wheel periphery to indicate in, say, thousandths of an inch the clearance spaces 31 existing at any time between the rotor ribs and the substantially smooth internal casing wall. It will be obvious that turning of the hand wheel 52 causes raising or lowering of the shaft 37 and the rotor carried thereby, since the hand wheel and the sleeve 48 to which the hand wheel is fixed constitute in effect a screw element working in the nut afforded by the partition 18. Accidental movement of the sleeve 48 may be prevented by an annular locking member 60 threaded onto the exterior of such sleeve immediately above the partition 18 and capable of being tightened down against the upper face of such partition.

In order to prevent leakage of material from the lower end of the casing 21 past the shaft 37 into the bearing 41, the shaft may pass through a suitable stuffing box within the opening in the table 20 for such shaft, but, as shown, a ring 61 is slidably fitted on said shaft above such opening and is provided with an upstanding pin 62 engaging within a recess 63 extending upwardly into a rotor 24 from the lower rotor face. The pin thus serves to rotate the ring 61 as the rotor is being rotated; and such material as may reach the ring 61 is centrifugally thrown off thereby and thus kept from leaking past the shaft. Such a spinning ring seal is particularly adapted to prevent leakage past the shaft when the material in the casing is under relatively low pressure, say, downwards of about five pounds, but when the machine is discharging under appreciably higher pressure, for instance, is discharging material to a receiving tank located twenty or more feet above its discharge outlet, a packing may be required to prevent leakage of material past the shaft.

In some instances, it may be desirable to introduce into the casing along with the material to be treated air or other gas under atmospheric or superatmospheric pressure; and, to this end, a valved air or gas inlet 64 is shown communicating with the receiving space 30 of the casing 21. It might be remarked that the presence of air or other gas in the casing is sometimes desirable for promoting the formation of stable emulsions, such as stable emulsions of hydrocarbon oils in water. So, too, the introduction of a small volume of air into the machine hereof along with so-called cheese-spread mixtures gives rise to a desirable "tang" in the homogenized cheese-spread produced by the machine. It is also possible to introduce air into the machine hereof by feeding material into the casing 21 at a rate or volume lower than the machine can take, thereby sucking some air into the machine along with the material being fed.

The rotor of the machine hereof is designed to be operated at very high rates of speed, for instance, at 2400 to 3600 or even more revolutions per minute; and it is for this reason that the shaft of the electric motor 12 of the machine hereof is shown as being coupled directly to the rotor shaft. Indeed, when extremely fine particle size homogenization, emulsion, or dispersion of material is desired, the electric motor 12 of the machine hereof may advantageously be replaced by a higher speed prime mover, such as a steam turbine rotating at, say, 10,000 or even more revolutions per minute.

I claim:

1. A machine of the class described comprising an upstanding shell whose internal wall is substantially smooth and constitutes a surface of revolution, a rotor which is arranged axially within said shell and carries spaced ribs on its periphery extending substantially from its upper end to its lower end and clearing slightly the internal shell wall, said internal shell wall and rotor periphery defining a plurality of compartments between said ribs and the leading rib faces merging smoothly and in the substantial absence of pockets with the rotor periphery, means for rotating said rotor in a direction to constitute said rib faces the leading ones, means for delivering material to be treated into the upper end of the shell, and means for withdrawing treated material from the lower end of said shell.

2. A machine of the class described comprising an upstanding shell whose internal wall is substantially smooth and frusto-conical, a rotor which is arranged axially within said shell and carries spaced ribs on its periphery extending substantially from its upper end to its lower end and clearing slightly the internal shell wall, said internal shell wall and rotor periphery defining a plurality of compartments between said ribs and the leading rib faces merging smoothly and in the substantial absence of pockets with the rotor periphery, means for rotating said rotor in a direction to constitute said rib faces the leading ones, means for axially adjusting the rotor relative to said shell and thereby varying the clearance between the ribs and the internal shell wall, means for delivering material to be treated into the upper end of said shell, and means for withdrawing treated material from the lower end of said shell.

3. A machine of the class described comprising an upstanding shell whose internal wall is substantially smooth and constitutes a surface of revolution; a rotor which is arranged axially within said shell, whose upper end is spaced from the upper end of said shell, and whose periphery carries spaced ribs extending helically substantially from its upper end to its lower end and clearing slightly the internal shell wall; said internal shell wall and rotor periphery defining a plurality of helical compartments between said ribs and the leading rib faces merging smoothly and in the substantial absence of pockets with the rotor periphery; means for rotating said rotor in a direction to constitute said rib faces the leading ones, means for delivering material to be treated into the upper end of the shell, and means for withdrawing treated material from the lower end of said shell.

4. A machine of the class described comprising an upstanding shell whose internal wall is substantially smooth and frusto-conical, a rotor which is arranged axially within said shell and which carries spaced ribs on its periphery extending helically substantially from its upper end to its lower end and clearing slightly the internal shell wall, said internal shell wall and rotor periphery defining a plurality of helical compartments between said ribs and the leading rib faces merging smoothly and in the substantial absence of pockets with the rotor periphery, means for rotating said rotor in a direction to constitute said rib faces the leading ones, means for axially adjusting the rotor relative to said shell and thereby varying the clearance between the ribs and the internal shell wall, means for delivering material to be treated into the upper end of said shell, and means for withdrawing treated material from the lower end of said shell.

5. A machine of the class described comprising an upstanding shell whose internal wall is substantially smooth and frusto-conical, a rotor which is arranged axially within said shell and which carries spaced ribs on its periphery extending substantially from its upper end to its lower end and clearing slightly the internal shell wall, said internal shell wall and rotor periphery defining a plurality of compartments between said ribs and the leading rib faces merging smoothly and in the substantial absence of pockets with the rotor periphery, a support to which the lower end of said shell is removably secured, a rotor shaft passing through said support, a prime mover for rotating said shaft at high speed in a direction to constitute said rib faces the leading ones arranged under said support, said shaft being connected for rotation to said prime mover but being axially adjustable relative to said shell so as to enable variation of the clearance between the ribs and the internal shell wall, means for delivering material to be treated into the upper end of said shell, and means for withdrawing treated material from the lower end of said shell.

6. A machine of the class described comprising an upstanding shell whose internal wall is substantially smooth and constitutes a surface of revolution, a rotor which is arranged axially within said shell and which carries spaced ribs on its periphery extending helically substantially from its upper to its lower end and clearing slightly the internal shell wall, said internal shell wall and rotor periphery defining a plurality of helical compartments between said ribs and the leading rib faces merging smoothly and in the substantial absence of pockets with the rotor periphery, a support to which the lower end of said shell is removably secured, a rotor shaft passing through said support, a prime mover for rotating said shaft in a direction to constitute said rib faces the leading ones arranged under said support, means for delivering material to be treated into the upper end of said shell and means for withdrawing treated material from the lower end of said shell.

OSCAR F. NEITZKE.